US012571493B2

(12) United States Patent
    Buck et al.

(10) Patent No.: US 12,571,493 B2
(45) Date of Patent: Mar. 10, 2026

(54) FLUID HANDLING COUPLINGS

(71) Applicant: Colder Products Company, Roseville, MN (US)

(72) Inventors: Samuel C. Buck, Saint Paul, MN (US); Blake M. Harris, Maple Grove, MN (US); Emma N. Miller, St. Paul, MN (US); Grant A. Wilhelm, Plymouth, MN (US)

(73) Assignee: Colder Products Company, Roseville, MN (US)

( * ) Notice: Subject to any disclaimer, the term of this patent is extended or adjusted under 35 U.S.C. 154(b) by 99 days.

(21) Appl. No.: 18/738,198

(22) Filed: Jun. 10, 2024

(65) Prior Publication Data

US 2024/0410507 A1     Dec. 12, 2024

Related U.S. Application Data

(60) Provisional application No. 63/472,421, filed on Jun. 12, 2023.

(51) Int. Cl.
    *F16L 37/40*     (2006.01)
    *F16K 15/02*     (2006.01)

(52) U.S. Cl.
    CPC ............ *F16L 37/40* (2013.01); *F16K 15/026* (2013.01)

(58) Field of Classification Search
    CPC ... F16L 37/32; F16L 37/40; Y10T 137/87949; Y10T 137/87957
    USPC ...................................................... 251/149.6
    See application file for complete search history.

(56) References Cited

U.S. PATENT DOCUMENTS

| | | | | |
|---|---|---|---|---|
| 3,567,175 | A * | 3/1971 | Sciuto, Jr. ............... | F16L 37/40 |
| | | | | 251/149.6 |
| 3,741,521 | A * | 6/1973 | Tatsuno ................... | F16L 37/40 |
| | | | | 251/149.7 |
| 4,060,219 | A * | 11/1977 | Crawford ............... | F16L 37/40 |
| | | | | 251/149.6 |
| 4,541,658 | A | 9/1985 | Bartholomew | |
| 4,660,803 | A | 4/1987 | Johnston et al. | |
| 4,792,115 | A * | 12/1988 | Jindra ..................... | F16L 37/38 |
| | | | | 251/149.6 |
| 4,856,823 | A | 8/1989 | Heren | |
| 4,946,455 | A | 8/1990 | Rosen | |
| 5,772,263 | A | 6/1998 | Lewis | |
| 7,028,983 | B2 | 4/2006 | Ozaki et al. | |
| 7,082,957 | B2 | 8/2006 | Guest | |
| 7,658,205 | B1 | 2/2010 | Edelman et al. | |
| 7,921,875 | B2 | 4/2011 | Moriiki et al. | |
| 8,910,919 | B2 | 12/2014 | Bonnal et al. | |
| 10,112,039 | B2 | 10/2018 | Naftalovitz et al. | |
| 11,067,210 | B2 | 7/2021 | Vranish | |

(Continued)

OTHER PUBLICATIONS

International Search Report and Written Opinion in International Appln. No. PCT/US2024/033216, mailed on Nov. 26, 2024, 19 pages.

*Primary Examiner* — Robert K Arundale
(74) *Attorney, Agent, or Firm* — Fish & Richardson P.C.

(57) ABSTRACT

Fluid couplings described herein are designed be assembled efficiently and economically. In example embodiments, the fluid couplings are designed with minimal component parts so that the fluid couplings are additionally economical to produce. In some embodiments, the fluid couplings described herein include internal valve components. Some such fluid couplings are designed to prevent spillage of fluid when connecting and disconnecting the couplings.

4 Claims, 11 Drawing Sheets

(56)                    References Cited

U.S. PATENT DOCUMENTS

| | | | |
|---|---|---|---|
| 2005/0242315 A1 | 11/2005 | Lund | |
| 2006/0185739 A1* | 8/2006 | Niki ........................ | F16L 37/40 |
| | | | 137/543.23 |
| 2010/0230950 A1 | 9/2010 | Williams et al. | |
| 2013/0092271 A1 | 4/2013 | Downs et al. | |
| 2013/0186491 A1* | 7/2013 | Liu ......................... | F16L 37/23 |
| | | | 137/614 |
| 2022/0154864 A1 | 5/2022 | Langer | |
| 2022/0163155 A1* | 5/2022 | Le Quere ................ | F16L 37/42 |
| 2024/0019065 A1* | 1/2024 | Durieux ................. | F16L 37/42 |

* cited by examiner

130

136

136

136

136

136

136

131

130

132

133

136

134

9     9

136

136

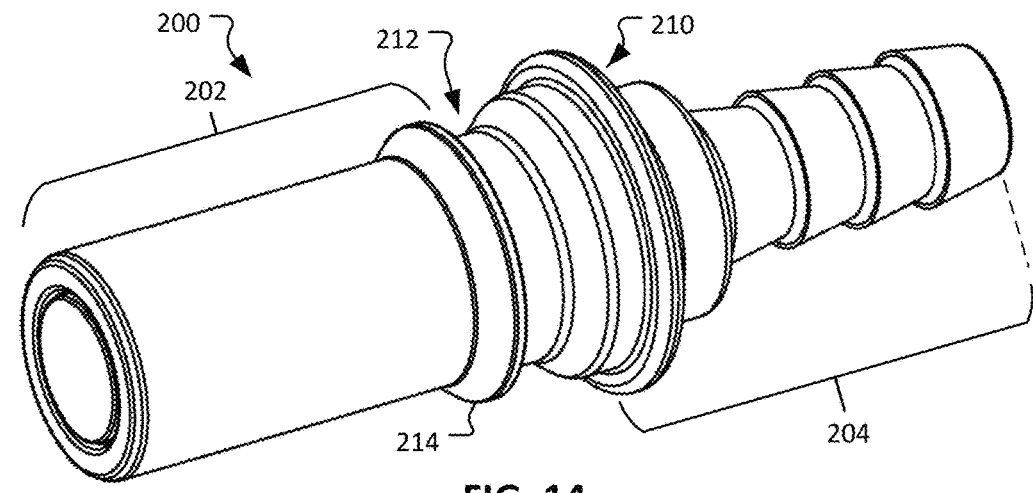
FIG. 14
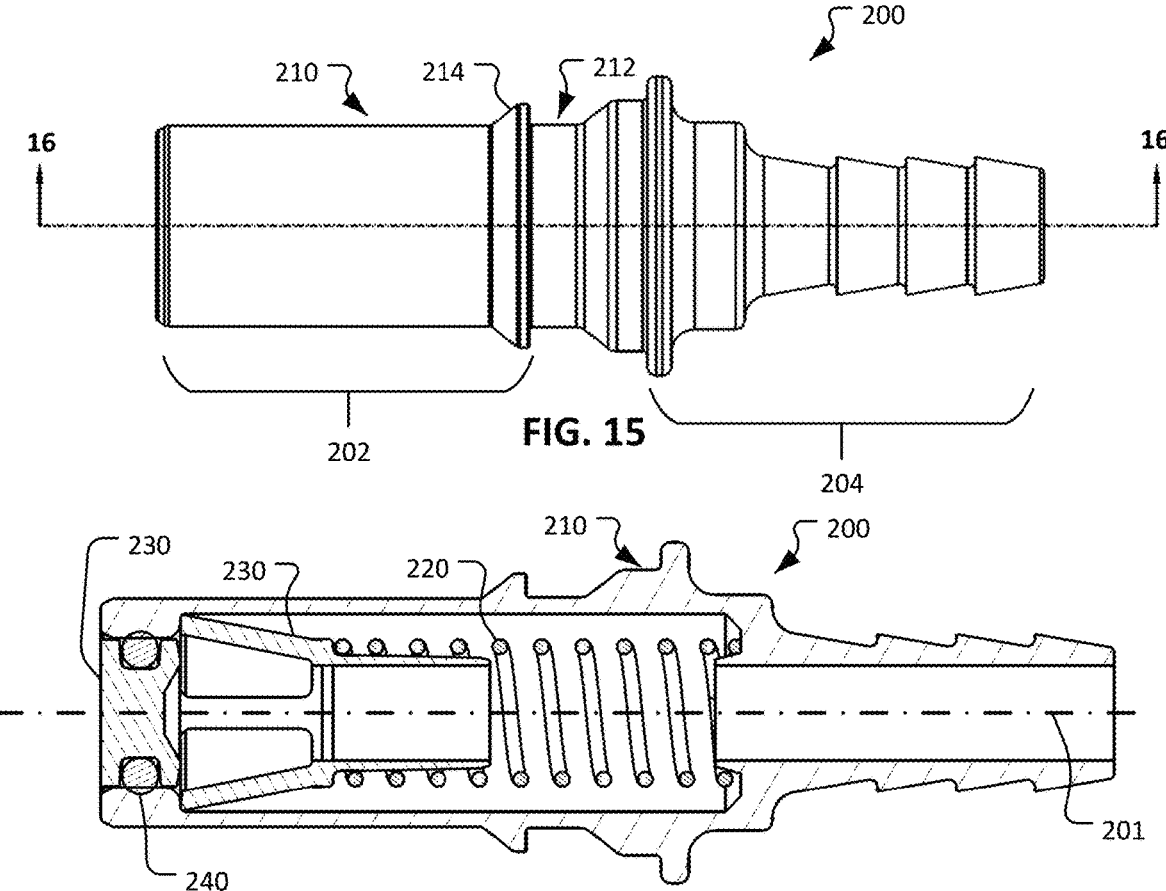
FIG. 15
FIG. 16

FLUID HANDLING COUPLINGS

CROSS-REFERENCE TO RELATED APPLICATIONS

This application claims the benefit of U.S. Provisional Application Ser. No. 63/472,421 filed Jun. 12, 2023. The disclosure of the prior application is considered part of (and is incorporated by reference in) the disclosure of this application.

TECHNICAL FIELD

This document relates to fluid handling devices. For example, this document relates to fluid handling couplings that are designed to be assembled efficiently.

BACKGROUND

Fluid handling components such as fluid couplings allow fluid communication between two or more components. Some fluid couplings include features that allow male and female components to be quickly connected or disconnected, and may include one or more internal valve components that selectively block or allow flow of fluid through the fluid couplings.

Fluid couplings with internal valve components typically have multiple component parts that are assembled into a fully completed and functional fluid coupling. The assembly process can be a significant aspect of the manufacturing cost structure of some fluid couplings.

SUMMARY

This document describes fluid handling components. For example, this document describes fluid couplings that are designed to be assembled efficiently and economically. Some such fluid couplings are designed to prevent spillage of fluid when connecting and disconnecting the couplings. In some embodiments, the fluid couplings described herein include internal valve components. In example embodiments, the fluid couplings are designed with minimal component parts so that the fluid couplings are economical to produce.

The fluid coupling devices described herein may also be referred to as male couplings, "coupling halves," and/or "connectors." The male couplings may also be referred to as "inserts" that are designed to be used in engagement with female couplings that may be referred to as "bodies."

In one aspect, this disclosure is directed to a fluid coupling that includes a main body defining an internal space and a longitudinal axis. The main body includes a first end configured to couple with another fluid coupling and a termination end opposite of the first end. The first end defines an opening leading to the internal space. The fluid coupling also includes a spring disposed in the internal space, and a valve member. The valve member includes a front face; a seal groove portion defining a seal groove; a post extending from the seal groove portion; and multiple deflectable elements extending from the seal groove portion and positioned radially around the post. The deflectable elements are radially deflectable between: (i) a compressed configuration in which an outer diameter of the deflectable elements is less than an inner diameter of the opening and (ii) a relaxed configuration in which the outer diameter of the deflectable elements is greater than the inner diameter of the opening. The valve member is longitudinally movable within the internal space between: (i) an open position in which a fluid flow path through the fluid coupling is defined and (ii) a closed position in which the fluid flow path is blocked by the valve member. An end portion of the spring is disposed between the post and the deflectable elements to prevent the deflectable elements from moving from the relaxed configuration to the compressed configuration.

Such a fluid coupling may optionally include one or more of the following features. The main body may be a unitary member. In some embodiments, the spring biases the valve member to the closed position. The front face of the valve member may be flush with a front face of the first end of the main body when the valve member is in the closed position.

In another aspect, this disclosure is directed to a method of assembling a fluid coupling. The method includes: (i) inserting a spring through an end opening defined by a main body of the fluid coupling and into an internal space defined by the main body, wherein the internal space has an inner diameter that is larger than an inner diameter of the end opening; (ii) radially compressing multiple deflectable elements of a valve member to reconfigure the valve member from a relaxed configuration to a radially compressed configuration, wherein an outer diameter of the valve member is larger than the inner diameter of the end opening when the valve member is in the relaxed configuration, and wherein the outer diameter of the valve member is smaller than the inner diameter of the end opening when the valve member is in the radially compressed configuration; and (iii) while the valve member is in the radially compressed configuration, inserting the valve member through the end opening. The valve member reconfigures itself to the relaxed configuration after the deflectable elements have passed through the end opening and into the internal space.

Such a method may optionally include one or more of the following features. When the valve member reconfigures itself to the relaxed configuration, an end portion of the spring may become engaged with the valve member in a position that prevents the deflectable elements from moving from the relaxed configuration to the compressed configuration. The valve member may be engaged within the end opening when the valve member is in a closed position in which a fluid flow path through the fluid coupling is blocked by the valve member.

In another aspect, this disclosure is directed to another fluid coupling. The fluid coupling includes: (a) a main body defining an internal space and a longitudinal axis, the main body comprising a first end configured to couple with another fluid coupling and a termination end opposite of the first end, the first end defining an opening leading to the internal space; (b) a spring disposed in the internal space; and (c) a valve member that is longitudinally movable within the internal space between: (i) an open position in which a fluid flow path through the fluid coupling is defined and (ii) a closed position in which the fluid flow path is blocked by the valve member. The valve member includes: a front face; a seal groove portion defining a seal groove; a post on an opposite end of the valve member in comparison to the seal groove portion; and multiple deflectable elements coupled to the post as cantilevers and extending toward the seal groove portion. The deflectable elements are radially deflectable between: (i) a compressed configuration in which an outer diameter of the deflectable elements is less than or equal to an inner diameter of the opening and (ii) a relaxed configuration in which a maximum outer diameter of the deflectable elements is greater than the inner diameter of the opening.

Such a fluid coupling may optionally include one or more of the following features. In some embodiments, free ends of the multiple deflectable elements abut against an internal wall of the main body that defines the opening when the valve member is in the closed position. A portion of the fluid flow path may extend longitudinally through the post when the valve member is in the open position. A portion of the spring may be coiled around the post.

In another aspect, this disclosure is directed to another fluid coupling. The fluid coupling includes a main body defining an internal space and a longitudinal axis. The main body includes: (a) a first end configured to couple with another fluid coupling; (b) a termination end opposite of the first end, the termination end defining an opening leading to the internal space; (c) two or more arcuate radial protrusions that are circumferentially spaced apart from each other to define two or more gaps therebetween, a spring disposed in the internal space; and (d) a valve member that is longitudinally movable within the internal space between: (i) an open position in which a fluid flow path through the fluid coupling is defined and (ii) a closed position in which the fluid flow path is blocked by the valve member. The valve member includes a cylindrical seal groove portion including a seal; and two or more fins extending from the seal groove portion. Each fin of the two or more fins has a thickness that is equal to or less than a width of each gap of the two or more gaps.

Such a fluid coupling may optionally include one or more of the following features. A maximum outer diameter defined by the two or more fins may be greater than an outer diameter of the seal groove portion. A maximum outer diameter defined by the two or more fins may be greater than an inner diameter defined by the two or more arcuate radial protrusions.

In another aspect, this disclosure is directed to a method of assembling the fluid couplings described herein. The method includes: inserting the valve member into the internal space by passing the two or more fins through the two or more gaps; and after inserting the valve member, inserting the spring into the internal space by: (i) placing a free end of the spring in one gap of the two or more gaps and (ii) pressing, screwing, or rotating the spring relative to the main body until the spring has fully passed beyond the two or more arcuate radial protrusions.

Some embodiments of the devices, systems and techniques described herein may provide one or more of the following advantages. First, some embodiments of the fluid couplings described herein are designed with minimal component parts and are designed for easy assembly so that the fluid couplings are relatively economical to produce. Such constructions may provide advantages such as manufacturing flexibility and succinct assembly processes that can be automated in some cases.

Second, in some embodiments the fluid couplings described herein are designed to prevent spillage or escape of fluid when initially connecting the couplings and when disconnecting the couplings after use. In some embodiments, the fluid couplings described herein include internal shut-off valves to prevent fluid spillage. By preventing spillage, material loss, soiling, contamination and costs associated with spillage may be reduced.

Third, in some embodiments the fluid couplings described herein are designed to prevent the inclusion of air into the fluid, as can often result during the process of joining male and female couplings together. By preventing air inclusion, the fluid is maintained in its most desired state.

Fourth, the fluid couplings described herein may include a robust latching system that is also convenient for decoupling the male and female couplings from each other. For example, a latch component of the female coupling may simply be depressed and the male and female couplings can then be separated from each other.

Fifth, the fluid couplings described herein may be designed to provide tactile feedback when the male and female portions of the fluid coupling are snapped together in the coupled configuration.

The details of one or more implementations are set forth in the accompanying drawings and the description below. Other features and advantages will be apparent from the description and drawings, and from the claims.

BRIEF DESCRIPTION OF DRAWINGS

The present description is further provided with reference to the appended Figures, wherein like structure is referred to by like numerals throughout the several views, and wherein:

FIG. 14 is a perspective view of another example fluid coupling in accordance with some embodiments.

FIG. 15 is a side view of the fluid coupling of FIG. 14.

FIG. 16 is longitudinal cross-section view of the fluid coupling of FIG. 14.

DETAILED DESCRIPTION OF ILLUSTRATIVE EMBODIMENTS

This document describes fluid handling components. For example, this document describes fluid couplings that are designed to be assembled efficiently and economically. In example embodiments, the fluid couplings are designed with minimal component parts so that the fluid couplings are additionally economical to produce. In some embodiments, the fluid couplings described herein include internal valve components. Some such fluid couplings are designed to prevent spillage of fluid when connecting and disconnecting the couplings.

As used herein, the term "fluid" means any substance that can be made to flow including, but is not limited to, liquids, gases, granular or powdered solids, mixtures or emulsions of two or more fluids, suspensions of solids within liquids or gases, gels, vapors, steam, mists, etc., without limitation.

Figures 1, 2:
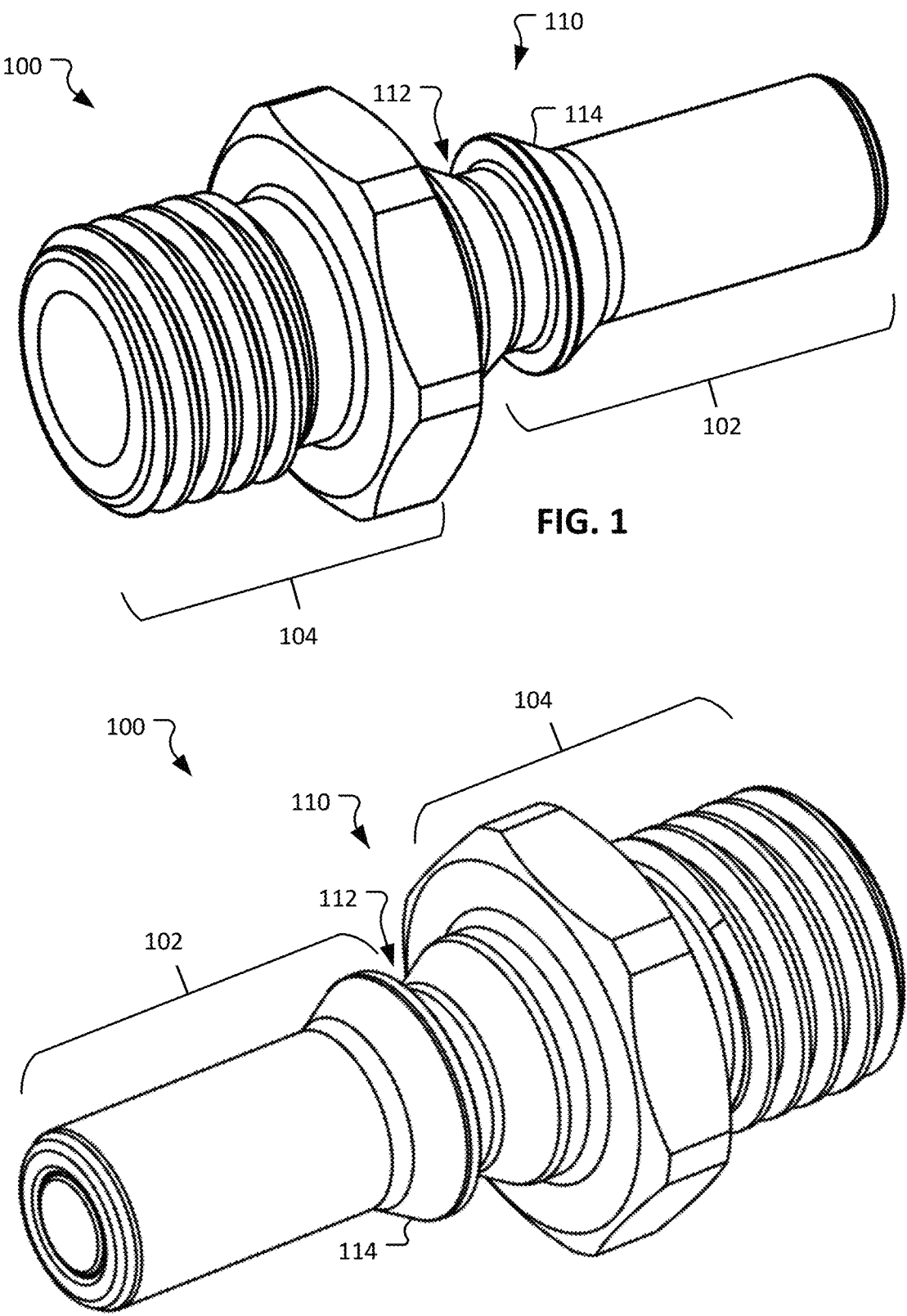
FIG. 1 is perspective view of an example fluid coupling in accordance with some embodiments.
FIG. 2 is another perspective view of the fluid coupling of FIG. 1.
Figure 3:
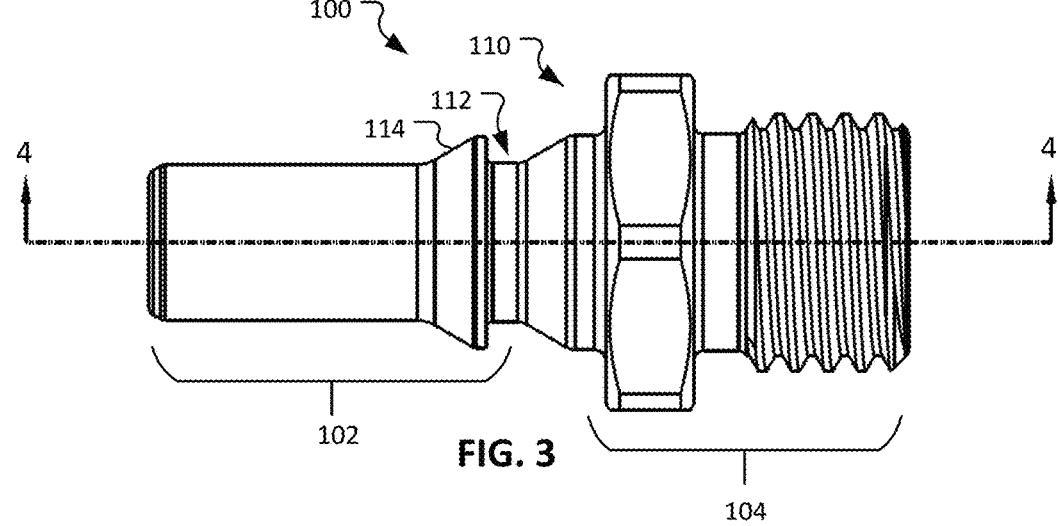
FIG. 3 is a side view of the fluid coupling of FIG. 1.

FIGS. 1-3 provide views of an example fluid coupling 100. The fluid coupling 100 can be connected with another fluid coupling (e.g., a female coupling, not shown; see e.g., U.S. Pat. No. 11,067,210) to establish a fluid flow path extending through the fluid coupling 100 and the connected fluid coupling. Thereafter, the fluid couplings can be disconnected to close the fluid flow path (with one or both of the fluid coupling 100 and the female coupling closing the fluid flow path when uncoupled). Hence, it can be said that the male coupling 100 and a compatible female coupling are designed and configured to be releasably coupleable with each other.

In some embodiments, the female coupling (not shown; see e.g., U.S. Pat. No. 11,067,210) can include an actuatable latch that is engageable within a latch groove 112 of the male fluid coupling 100 to releasably detain the male fluid coupling 100 and the female coupling in a coupled, operable configuration. In some embodiments, no such latch is included and no latch groove 112 is included on the male fluid coupling 100. In such a case, the male fluid coupling 100 and the female coupling can be mechanically forced toward each other and then held in that arrangement to put/keep them in the coupled, operable configuration.

In the depicted embodiment, the fluid coupling 100 includes a main body 110. The main body 110 includes a frustoconical portion 114 that serves as a lead-in to, and partially defines, the latch groove 112. That is, the frustoconical portion 114 includes a lead-in surface arranged at an angle or incline that allows a latch of a female coupling to ride along the angle or incline as the fluid coupling 100 is being coupled with a female coupling. After the latch has been moved past the frustoconical portion 114, the latch can then spring into engagement within the latch groove 112 to attain the fully coupled and latched arrangement.

The main body 110 includes a first end portion 102 and a second end portion 104. The first end portion 102 is configured to engage with another fluid coupling (e.g., a female fluid coupling, not shown). The opposite, second end portion 104 can also be referred to as a termination. In some embodiments, the second end portion 104 can be configured to be engaged with (and fluidly coupled with) a fluid conduit or component such as, but not limited to, a tube, a pipe, a hose, a fitting, a manifold, a container, and the like, without limitation.

In the depicted embodiment, the second end portion 104 is a threaded fitting. In some embodiments, the second end portion 104 can be any other suitable type of fitting or connection such as, but not limited to, a compression fitting, a quick disconnect, a sanitary fitting, hydraulic quick connection, luer fitting, a hose barb, a solder connection, a welded connection, a threaded connection (e.g., straight thread or pipe thread), and so on, without limitation. Such connections can be straight (as depicted) or in another arrangement such as, but not limited to, a 90° elbow arrangement, a 45° elbow, a straight fitting, a Tee fitting, a Y-fitting, and so on.

The materials from which one or more of the components of the male fluid coupling 100 (and other fluid couplings described herein) can be made of include thermoplastics. In particular embodiments, the materials from which the components of the male fluid coupling 100 is made of are thermoplastics, such as, but not limited to, acetal, ABS, polycarbonate, polysulfone, polyether ether ketone, polysulphide, polyester, polyvinylidene fluoride (PVDF), polyethylene, polyphenylsulfone (PPSU; e.g., Radel®), acrylonitrile butadiene styrene (ABS), polyetherimide (PEI; e.g., Ultem®), polypropylene, polyphenylene, polyaryletherketone, and the like, and combinations thereof. In some embodiments, the thermoplastics can include one or more fillers such as, but not limited to, glass fiber, glass bead, carbon fiber, talc, etc.

In some embodiments, the materials from which one or more of the components of the male fluid coupling 100 (and other fluid couplings described herein) are made of include metals such as, but not limited to copper, stainless steel, brass, aluminum, plated steel, zinc alloys, Hastelloy®, beryllium copper, and the like. In particular embodiments, the male fluid coupling 100 is metallic-free.

In some embodiments, as described further below, the male fluid coupling 100 can include one or more seal members. In some embodiments, the seal members can comprise materials such as, but not limited to, silicone, fluoroelastomers (FKM), ethylene propylene diene monomer (EPDM), thermoplastic elastomers (TPE), buna, buna-N, thermoplastic vulcanizates (TPV), and the like. The cross-sectional shape of such seal members can be circular, oval, D-shaped, X-shaped, square, rectangular, U-shaped, multi-lobed, L-shaped, V-shaped, and the like, or any other suitable shape, without limitation. The seal members may be externally lubricated (such as with an oil or grease) or internally lubricated.

Figure 4:
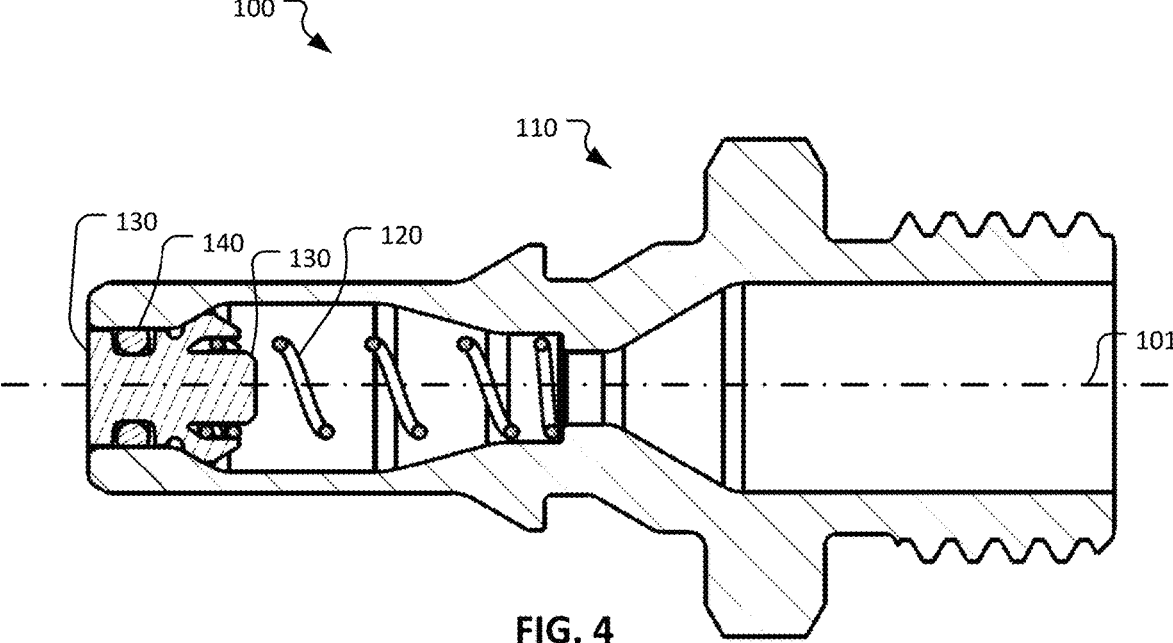
FIG. 4 is longitudinal cross-section view of the fluid coupling of FIG. 1.

Referring also to FIG. 4, the fluid coupling 100 includes a spring 120, a valve member 130, and a seal 140. The valve member 130 is movable relative to the main body 110 along a longitudinal axis 101 of the fluid coupling 100 between a closed position (as shown) and an open position.

Fluid is blocked by the valve member 130 from flowing through the fluid coupling 100 when the valve member 130 is in its closed position (as shown). Fluid can flow through the fluid coupling 100 when the valve member 130 is in its open position.

The spring 120 tends to force or bias the valve member 130 to its closed position. The valve member 130 can be moved towards its open position as a result of the fluid coupling 100 becoming engaged with another coupling (e.g., a female coupling).

The seal 140 is engaged with the valve member 130 and fluidly seals against an inner bore of the main body 110 while the valve member 130 is in its closed position (as shown).

Figures 5, 6:
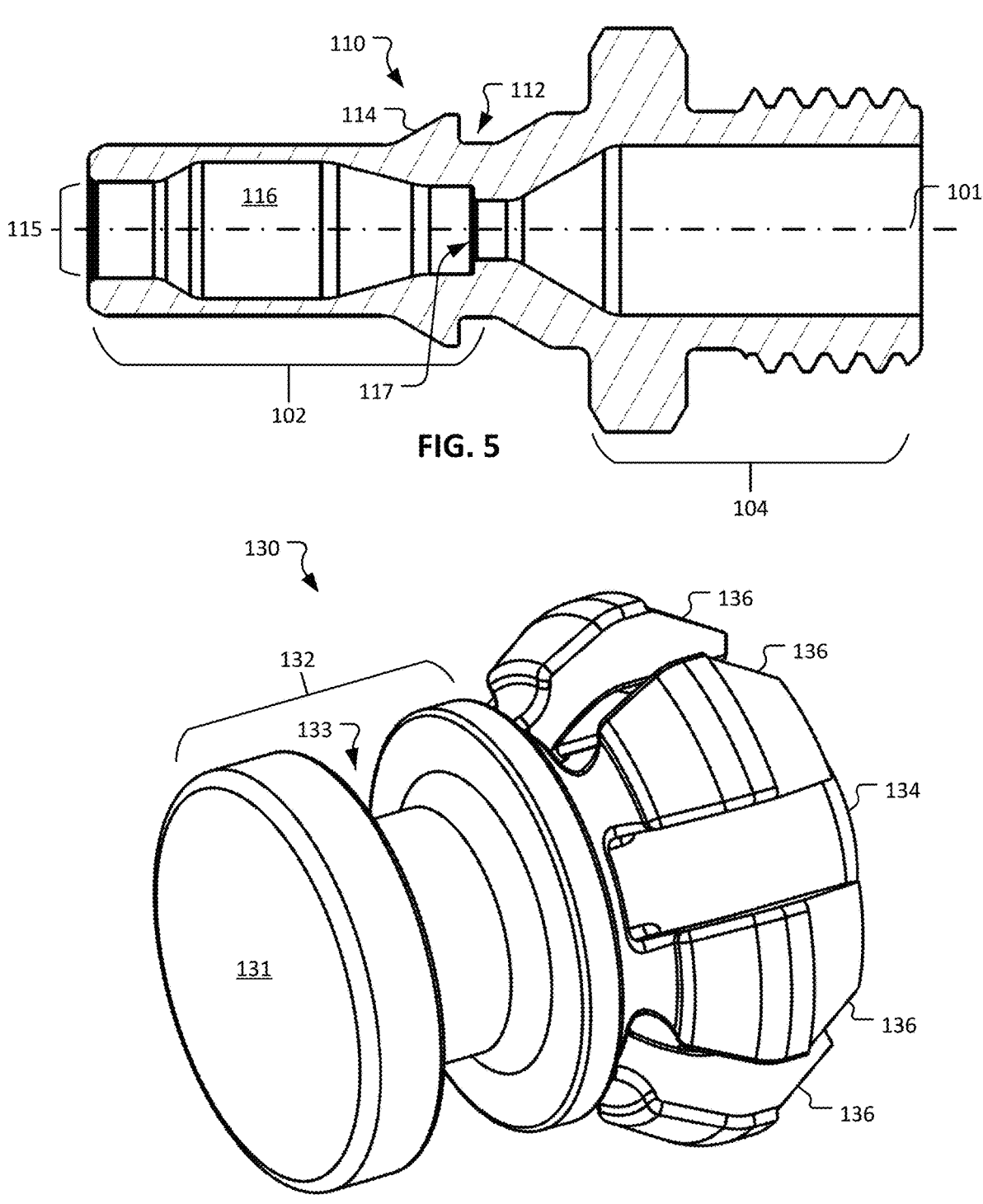
FIG. 5 is longitudinal cross-section view of a main body of the fluid coupling of FIG. 1.
FIG. 6 is a perspective view of a valve member of the fluid coupling of FIG. 1.

Referring also to FIG. 5, the main body 110 is shown here in isolation so that its features (especially its internal features) are more distinguishable. The first end portion 102 defines a first opening 115 that has a cylindrical wall. The first opening 115 leads to an internal space 116 defined by the main body 110. A second opening 117 is located at the other end of the internal space 116. The second opening 117 leads to the second end portion 104.

The valve member 130 and the seal 140 engages with the cylindrical wall of the first opening 115 when the valve member 130 is in its closed position (e.g., see FIG. 4). In that position, the seal 140 fluidly seals/closes the internal space 116. When the valve member 130 is in its open position, the valve member 130 is located within the internal space 116 and fluid can flow through the fluid coupling 100.

In the depicted embodiment, the diameter of the first opening 115 is smaller than the diameter of the internal space 116, and the diameter of the first opening 115 is larger than the diameter of the second opening 117.

Figure 7:
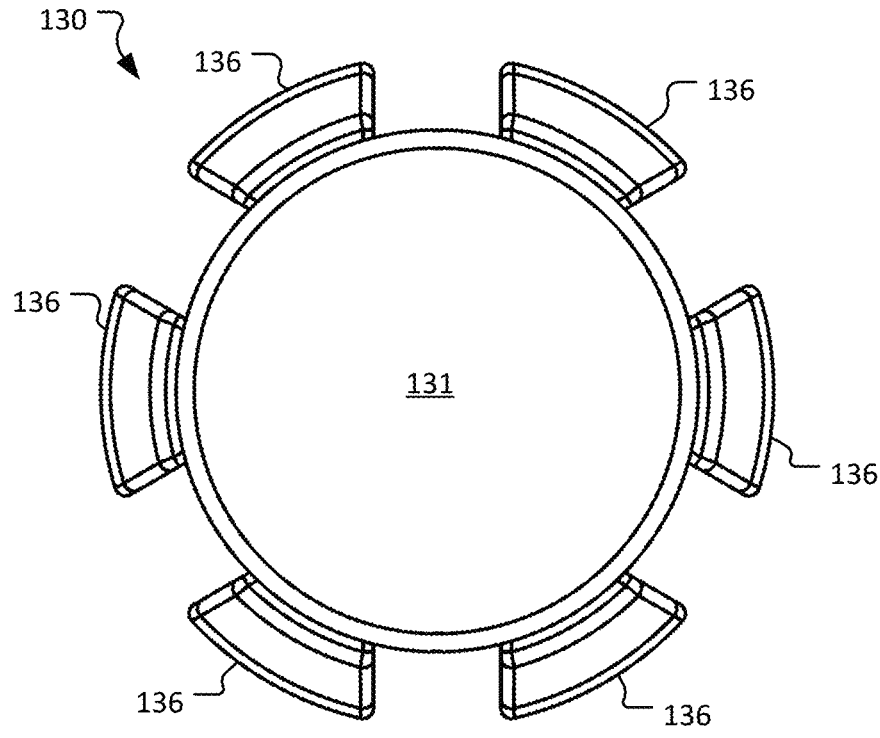
FIG. 7 is an end view of the valve member of FIG. 6.
Figure 8:
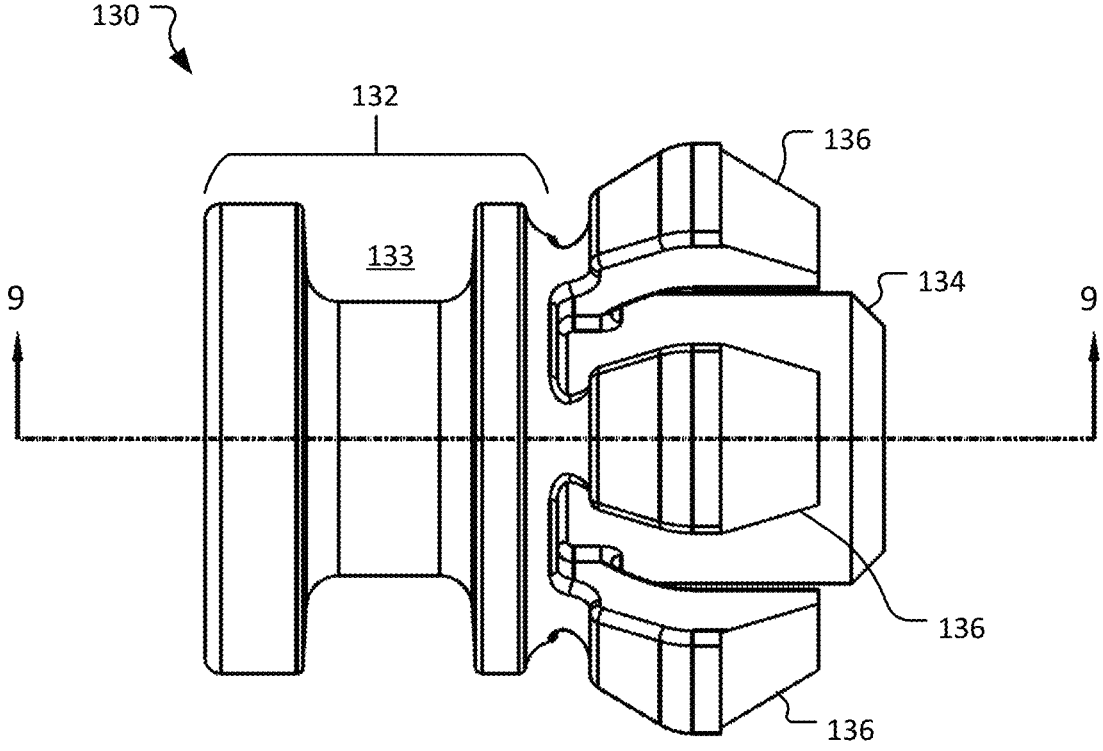
FIG. 8 is a side view of the valve member of FIG. 6.

FIGS. 6-8 show the valve member 130 in isolation so that its features are more distinguishable. The valve member 130 includes a front face 131, a seal groove portion 132 that defines a seal groove 133, a post 134, and multiple deflectable elements 136. The post 134 extends from the seal groove portion 132.

The multiple deflectable elements 136 also extend from the seal groove portion 132. The multiple deflectable elements 136 are positioned radially outward of, and concentrically around, the post 134. The multiple deflectable elements 136 are circumferentially spaced apart from each other. That is, the multiple deflectable elements 136 are not in contact with each other.

In the depicted embodiment, the valve member 130 includes six of the deflectable elements 136. In some embodiments, fewer or more than six of the deflectable elements 136 are included on a valve member 130. For example, in some embodiments one, two, three, four, five, seven, eight, nine, ten, eleven, twelve, or more than twelve of the deflectable elements 136 are included on a valve member 130.

Figures 9, 10:
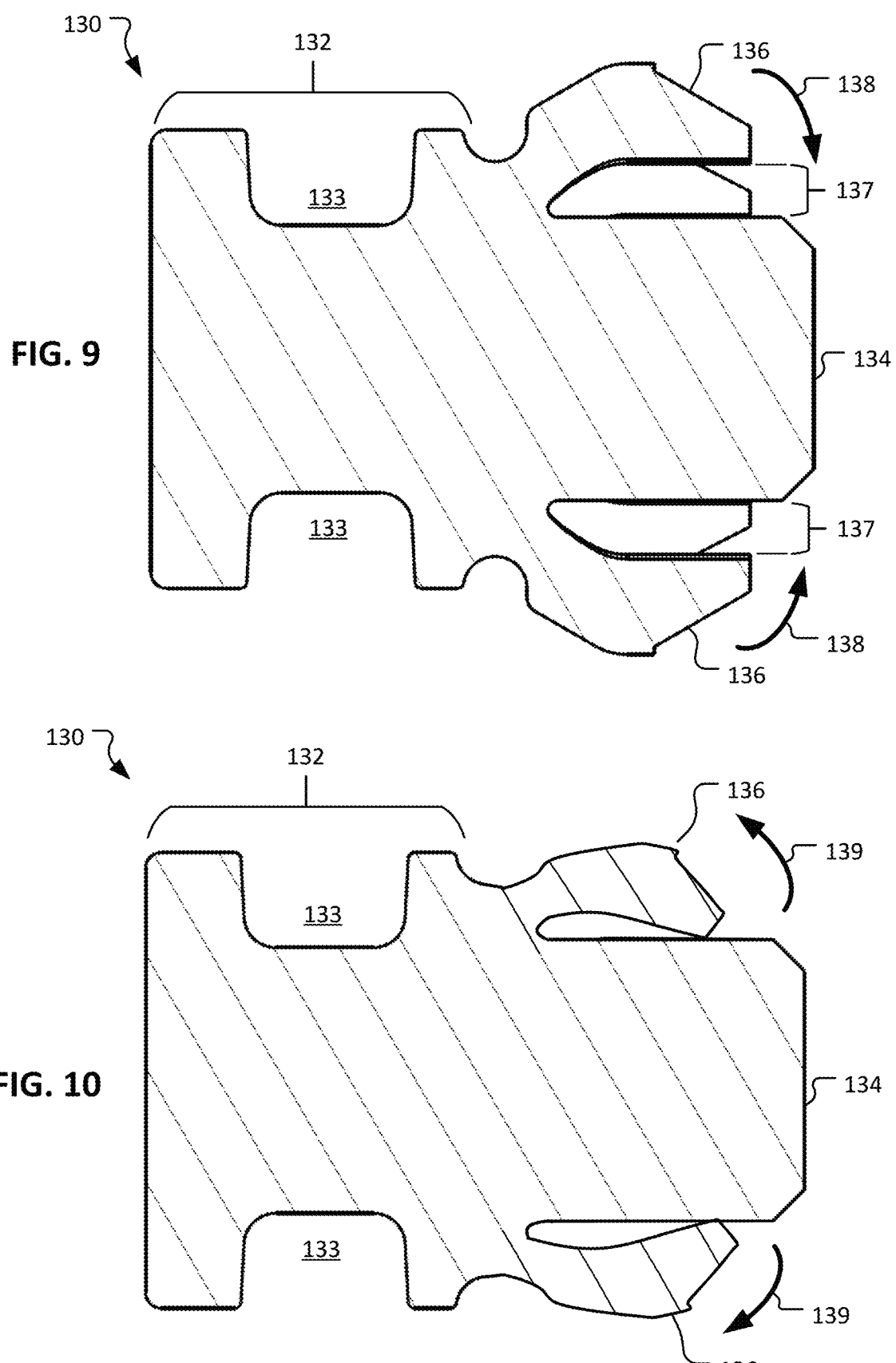
FIG. 9 is a longitudinal cross-section view of the valve member of FIG. 6 with the deflectable elements in their natural un-deflected orientations.
FIG. 10 is another longitudinal cross-section view of the valve member of FIG. 6 with the deflectable elements in their deflected orientations.

Referring also to FIG. 9, when the multiple deflectable elements 136 are in their relaxed (unstrained, natural, and undeflected) configurations as shown, an open space 137 is defined between each of the deflectable elements 136 and the post 134.

When the multiple deflectable elements 136 are in their relaxed (unstrained, natural, and undeflected) configurations (as shown in FIG. 9), the outer diameter of the multiple deflectable elements 136 is larger than the largest outer diameter of the seal groove portion 132. When the multiple deflectable elements 136 are in their relaxed configurations (as shown in FIG. 9), the outer diameter of the multiple deflectable elements 136 is larger than the diameter of the first opening 115 (e.g., see FIG. 5), and is smaller than the diameter of the internal space 116.

FIG. 9 also shows the arrows 138 that indicate the radial directions in which the multiple deflectable elements 136 are deflectable radially inwards toward the post 134.

FIG. 10 shows the positions of the multiple deflectable elements 136 when they are deflected radially inwards toward the post 134 to their compressed configuration positions. The application of radially inward forces to the multiple deflectable elements 136 is necessary to cause the deflection of the multiple deflectable elements 136 to their compressed configuration positions. After the removal of such radially inward forces, the multiple deflectable elements 136 will naturally tend to elastically spring back or rebound to their relaxed configuration positions (as shown in FIG. 9), as represented by the arrows 139.

When the multiple deflectable elements 136 are in their compressed configuration positions (as shown in FIG. 10), the open spaces 137 (as shown in FIG. 9) are not defined. When the multiple deflectable elements 136 have elastically sprung back or rebounded to their relaxed configuration positions, the open spaces 137 are once again defined (as shown in FIG. 9).

When the multiple deflectable elements 136 are in their compressed configurations (as shown in FIG. 10), the outer diameter of the multiple deflectable elements 136 is less than the outer diameter of the multiple deflectable elements 136 while they are in their relaxed configuration positions. When the multiple deflectable elements 136 are in their compressed configuration positions, the outer diameter of the multiple deflectable elements 136 is approximately equal to, or less than, the largest outer diameter of the seal groove portion 132. When the multiple deflectable elements 136 are in their compressed configuration positions, the outer diameter of the multiple deflectable elements 136 is equal to, or less than, the diameter of the first opening 115 (e.g., see FIG. 5), and is less than the diameter of the internal space 116.

Figures 11, 12, 13:
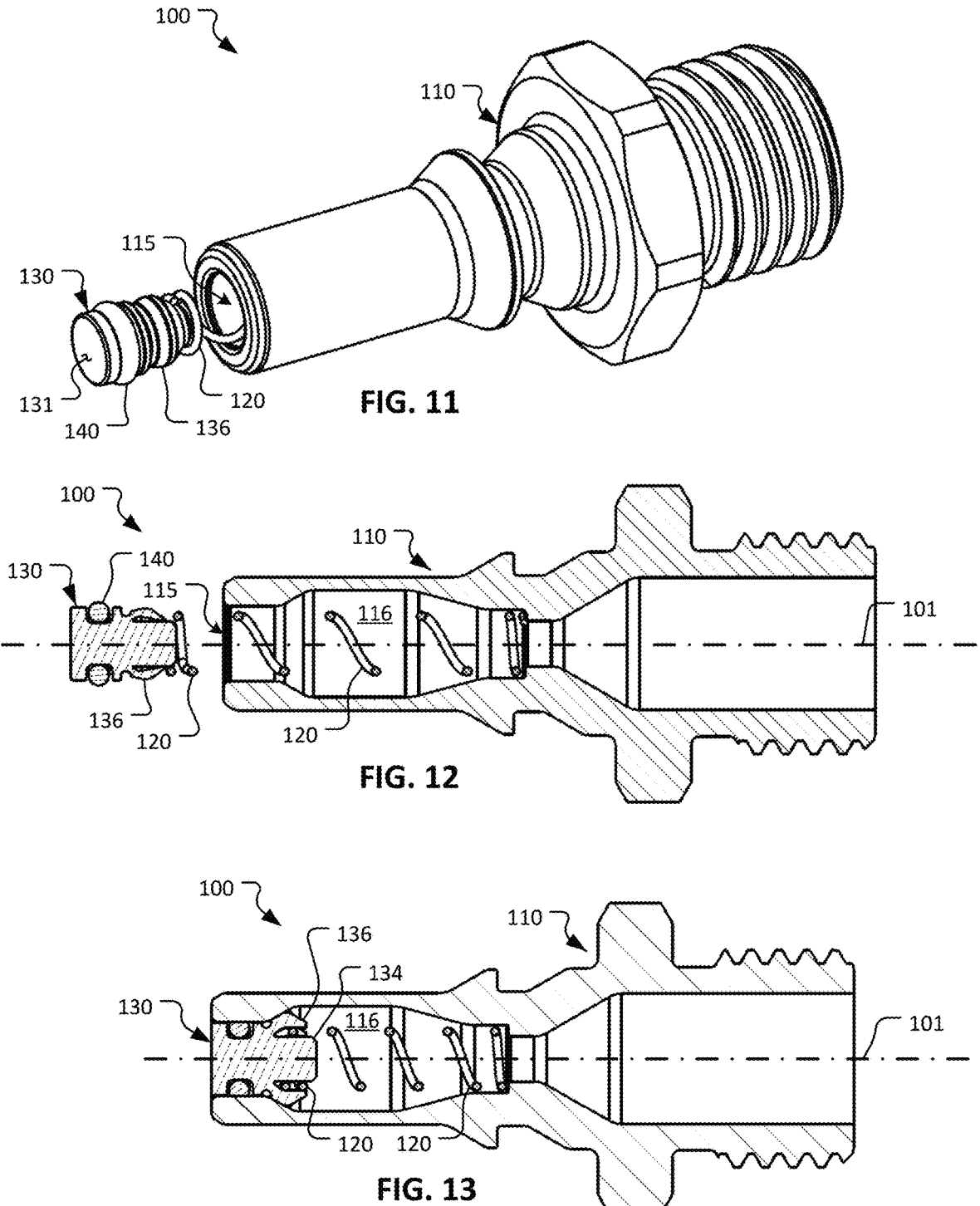
FIG. 11 is a perspective view of the fluid coupling of FIG. 1 in the process of being assembled.
FIG. 12 is a longitudinal cross-section view of the fluid coupling of FIG. 1 in the process of being assembled.
FIG. 13 is a longitudinal cross-section view of the fully assembled configuration of the fluid coupling of FIG. 1.

FIGS. 11 and 12 show how the fluid coupling 100 can be assembled or built to become the fluid coupling 100. In brief, both the spring 120 and the valve member 130 (with the seal 140) can be installed into engagement with the main body 110 through the first opening 115.

Now the assembly process of the fluid coupling 100 will be described in more detail. First, the spring 120 can be installed through the first opening 115 and into the interior space 116. An end portion of the spring 120 may still be extending out from the first opening 115 as shown. Second, the valve member 130 (with the seal 140 seated therein, and while the multiple deflectable elements 136 are held in their compressed configuration positions) can be inserted into the first opening 115.

As the valve member 130 is being inserted into the first opening 115, the valve member 130 compresses the spring 120 such that the spring 120 becomes fully positioned within the internal space 116. Also, as the valve member 130 is being inserted into the first opening 115, the cylindrical wall of the first opening 115 radially constrains the multiple deflectable elements 136 in their compressed configuration positions.

When the valve member 130 is inserted far enough into the main body 110, the multiple deflectable elements 136 will eventually clear the radially constraining cylindrical wall of the first opening 115 and emerge into the internal space 116. When the multiple deflectable elements 136 emerge into the internal space 116, the multiple deflectable elements 136 elastically spring back or rebound radially outward to their relaxed configuration positions (as shown in FIG. 9). When the multiple deflectable elements 136 elastically spring back or rebound radially outward to their relaxed configuration positions, the open spaces 137 between the post 134 and the multiple deflectable elements 136 are once again created (e.g., the spaces 137 open up). When the spaces 137 open up, an end portion of the spring 120 then becomes seated or engaged in the spaces 137.

As shown in FIG. 13, with the end portion of the spring 120 seated or engaged in the spaces 137 between the multiple deflectable elements 136 and the post 134, the multiple deflectable elements 136 are held in their relaxed configuration positions and are mechanically prevented from deflecting radially inward. Accordingly, and because the outer diameter of the multiple deflectable elements 136 in their relaxed configuration positions is larger than the diameter of the first opening 115, the presence of the spring 120 in the spaces 137 prevents the valve member 130 from being ejected out of the first opening 115. In this configuration, the fluid coupling 100 is fully functional.

In essence, only two assembly steps are required to build the fully functional fluid coupling 100: (i) insert the spring 120 and (ii) insert the valve member 130 with the seal 140. This can be performed manually or by an automated assembly process. In some embodiments, a funnel-like device or fixture can be used to radially compress the multiple deflectable elements 136 as the valve member 130 is being pushed into the first opening 115.

FIGS. 14 and 15 provide views of another example fluid coupling 200. The fluid coupling 200 can be connected with another fluid coupling (e.g., a female coupling, not shown; see e.g., U.S. Pat. No. 11,067,210) to establish a fluid flow path extending through the fluid coupling 200 and the connected fluid coupling. Thereafter, the fluid couplings can be disconnected to close the fluid flow path (with one or both of the fluid coupling 200 and the female coupling closing the fluid flow path when uncoupled). Hence, it can be said that the male coupling 200 and a compatible female coupling are designed and configured to be releasably coupleable with each other.

In some embodiments, the female coupling (not shown) can include an actuatable latch that is engageable within a latch groove 212 of the male fluid coupling 200 to releasably detain the male fluid coupling 200 and the female coupling in a coupled, operable configuration. In some embodiments, no such latch is included and no latch groove 212 is included on the male fluid coupling 200. In such a case, the male fluid coupling 200 and the female coupling can be mechanically forced toward each other and then held in that arrangement to put/keep them in the coupled, operable configuration.

In the depicted embodiment, the fluid coupling 200 includes a main body 210. The main body 210 includes a frustoconical portion 214 that serves as a lead-in to, and partially defines, the latch groove 212. That is, the frustoconical portion 214 includes a lead-in surface arranged at an angle or incline that allows a latch of a female coupling to ride up as the fluid coupling 200 is being coupled with a female coupling. After the latch has been moved past the frustoconical portion 214, the latch can then spring into engagement within the latch groove 212 to attain the fully coupled and latched arrangement.

The main body 210 includes a first end portion 202 and a second end portion 204. The first end portion 202 (which includes a sealing surface) is configured to engage with another fluid coupling (e.g., a female fluid coupling, not shown). The opposite, second end portion 204 can also be referred to as a termination. In some embodiments, the second end portion 204 can be configured to be engaged with (and fluidly coupled with) a fluid conduit or component such as, but not limited to, a tube, a pipe, a hose, a fitting, a manifold, container, and the like, without limitation.

In the depicted embodiment, the second end portion 204 is a barbed fitting. In some embodiments, the second end portion 204 can be any other suitable type of fitting or connection such as, but not limited to, a compression fitting, a quick disconnect, a sanitary fitting, hydraulic quick connection, luer fitting, a solder connection, a welded connection, a threaded connection (e.g., straight thread or pipe thread), and so on, without limitation. Such connections can be straight (as depicted) or in another arrangement such as, but not limited to, a 90° elbow arrangement, a 45° elbow, a straight fitting, a Tee fitting, a Y-fitting, and so on.

Referring also to the cross-sectional view of FIG. 16, the fluid coupling 200 includes a spring 220, a valve member 230, and a seal 240. The valve member 230 is movable relative to the main body 210 along a longitudinal axis 201 of the fluid coupling 200 between a closed position (as shown) and an open position in which an open fluid flow path is defined through the fluid coupling 200.

Fluid is blocked by the valve member 230 from flowing through the fluid coupling 200 when the valve member 230 is in its closed position (as shown). Fluid can flow through the fluid coupling 200 when the valve member 230 is in its open position.

The spring 220 tends to force or bias the valve member 230 to its closed position. The valve member 230 can be moved towards its open position as a result of the fluid coupling 200 becoming engaged with another coupling (e.g., a female coupling).

The seal 240 is engaged with the valve member 230 and fluidly seals against an inner bore of the main body 210 while the valve member 230 is in its closed position (as shown).

Figure 17:
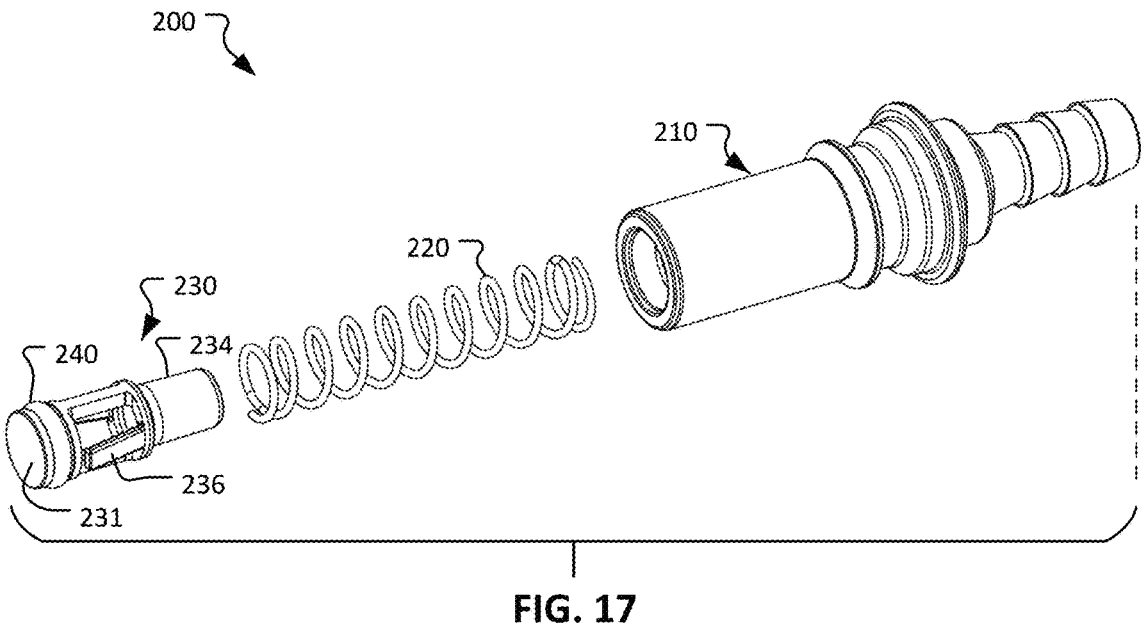
FIG. 17 is an exploded perspective view of the fluid coupling of FIG. 14.
Figure 18:
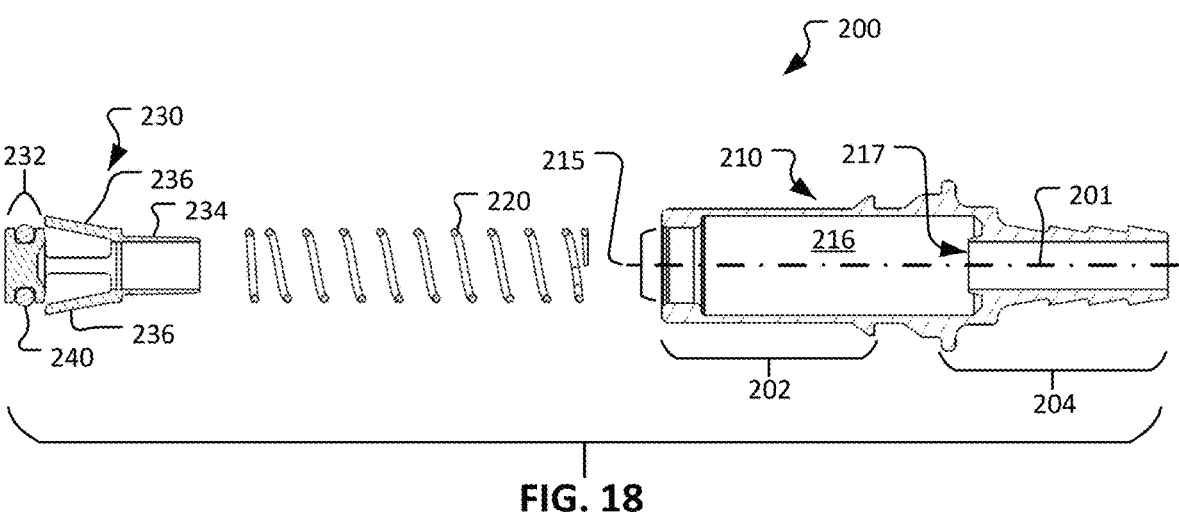
FIG. 18 is an exploded cross-sectional view of the fluid coupling of FIG. 14.

Referring also to the exploded views of FIGS. 17 and 18, the first end portion 202 of the main body 210 defines a first opening 215 that has a cylindrical wall. The first opening 215 leads to an internal space 216 defined by the main body 210. A second opening 217 is located at the other end of the internal space 216. The second opening 217 leads to the second end portion 204.

The valve member 230 and the seal 240 engages with the cylindrical wall of the first opening 215 when the valve member 230 is in its closed position (e.g., see FIG. 16). In that position, the seal 240 fluidly seals/closes the internal space 216. When the valve member 230 is in its open position, the valve member 230 is located within the internal space 216 and fluid can flow through the fluid coupling 200.

In the depicted embodiment, the diameter of the first opening 215 is smaller than the diameter of the internal space 216, and the diameter of the first opening 215 is larger than the diameter of the second opening 217.

The valve member 230 includes a front face 231, a seal groove portion 232 that defines a seal groove, a post 234, and multiple deflectable elements 236. The multiple deflectable elements 236 are positioned in a mid-body portion of the valve member 230 between the post 234 and the seal groove portion 232.

The multiple deflectable elements 236 are cantilevered members that are connected to the post 234 and that extend toward the seal groove portion 232 at an acute angle relative to the longitudinal axis 201. When the multiple deflectable elements 236 are in their relaxed (unstrained, natural, and undeflected) configurations as shown, the multiple deflectable elements 236 extend radially outward beyond the outer diameters of the post 234 and the seal groove portion 232. The multiple deflectable elements 236 are circumferentially spaced apart from each other. That is, the multiple deflectable elements 236 are not in contact with each other.

In the depicted embodiment, the valve member 230 includes two of the deflectable elements 236. In some embodiments, more than two of the deflectable elements 236 are included on a valve member 230. For example, in some embodiments three, four, five, six, seven, eight, nine, ten, eleven, twelve, or more than twelve of the deflectable elements 236 are included on a valve member 230.

When the multiple deflectable elements 236 are in their relaxed (unstrained, natural, and undeflected) configurations (as shown in FIGS. 17 and 18), the multiple deflectable elements 236 splay radially outward at an acute angle relative to the axis 201 such that the outer diameter of the free ends of the multiple deflectable elements 236 is larger than the largest outer diameter of the seal groove portion 232 and the post 234. When the multiple deflectable elements 236 are in their relaxed configurations (as shown in FIGS. 17 and 18), the outer diameter of the free ends of the multiple deflectable elements 236 is also larger than the diameter of the first opening 215, and is approximately equal to the inner diameter of the internal space 216.

Figure 19:
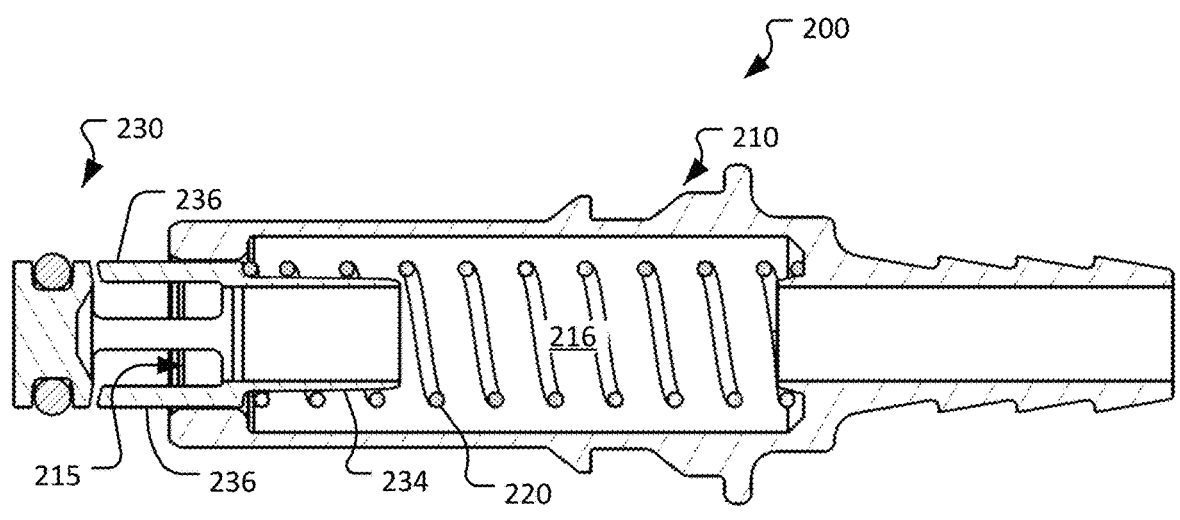
FIG. 19 is cross-sectional view of the fluid coupling of FIG. 14 in the process of being assembled.

Referring also to FIG. 19, here the assembly process of the fluid coupling 200 is depicted. First, the spring 220 is installed into the internal space 216 via the first opening 215. The post 234 of the valve member 230 is then engaged with the spring 220 (or the two can be engaged with each other and then inserted into the internal space 216 together), and the valve member 230 is pressed into the internal space 216 via the first opening 215. As the valve member 230 is being inserted into the internal space 216, the multiple deflectable elements 236 are deflected radially inwards in order to pass through the first opening 215. The application of radially inward forces to the multiple deflectable elements 236 is necessary to cause the deflection of the multiple deflectable elements 236 to their radially compressed configuration positions (as shown in FIG. 19).

Figure 20:
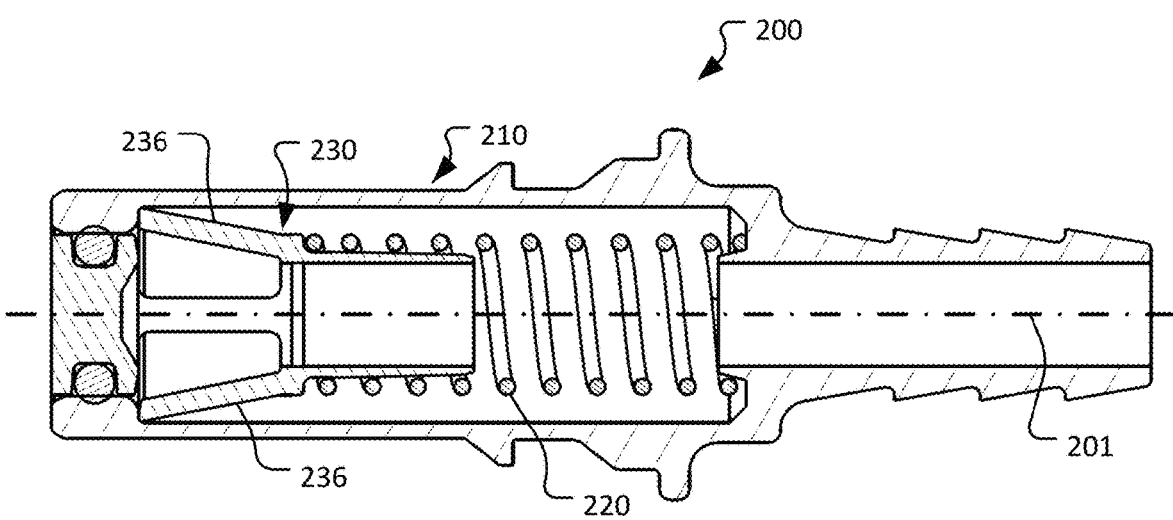
FIG. 20 is cross-sectional view of the fluid coupling of FIG. 14 in a fully assembled configuration.

Referring also to FIG. 20, when the multiple deflectable elements 236 have passed fully through the first opening 215 and into the internal space 216, the radially inward forces exerted on the multiple deflectable elements 236 by the first opening 215 are no longer exerted on the multiple deflectable elements 236 and the multiple deflectable elements 236 will then naturally tend to elastically spring back or rebound radially outward to their relaxed configuration positions (as shown in FIGS. 17, 18, and 20). In such a configuration (as shown in FIG. 20), the valve member 230 is detained in movable engagement within the main body 210. That is, the valve member 230 is captured between the forces exerted by the spring 220 and the physical interference between the multiple deflectable elements 236 and the internal wall of the main body 210 that surrounds the first opening 215.

The valve member 230 is movable along the axis 201 between its open and closed positions. The closed position is shown in FIG. 20. To transition to the open position, the valve member 230 will be pressed into the internal space 216 by the mating coupling (thereby compressing the spring 220).

In essence, only two assembly steps are required to build the fully functional fluid coupling 200: (i) insert the spring 220 into the internal space 216 of the main body 210 and (ii) insert the valve member 230 into the internal space 216 of the main body 210 so that the multiple deflectable elements 236 clear past the first opening 215 so that the multiple deflectable elements 236 are fully in the internal space 216 of the main body 210. This can be performed manually, or by an automated or semi-automated assembly process.

Figures 21, 22, 23:
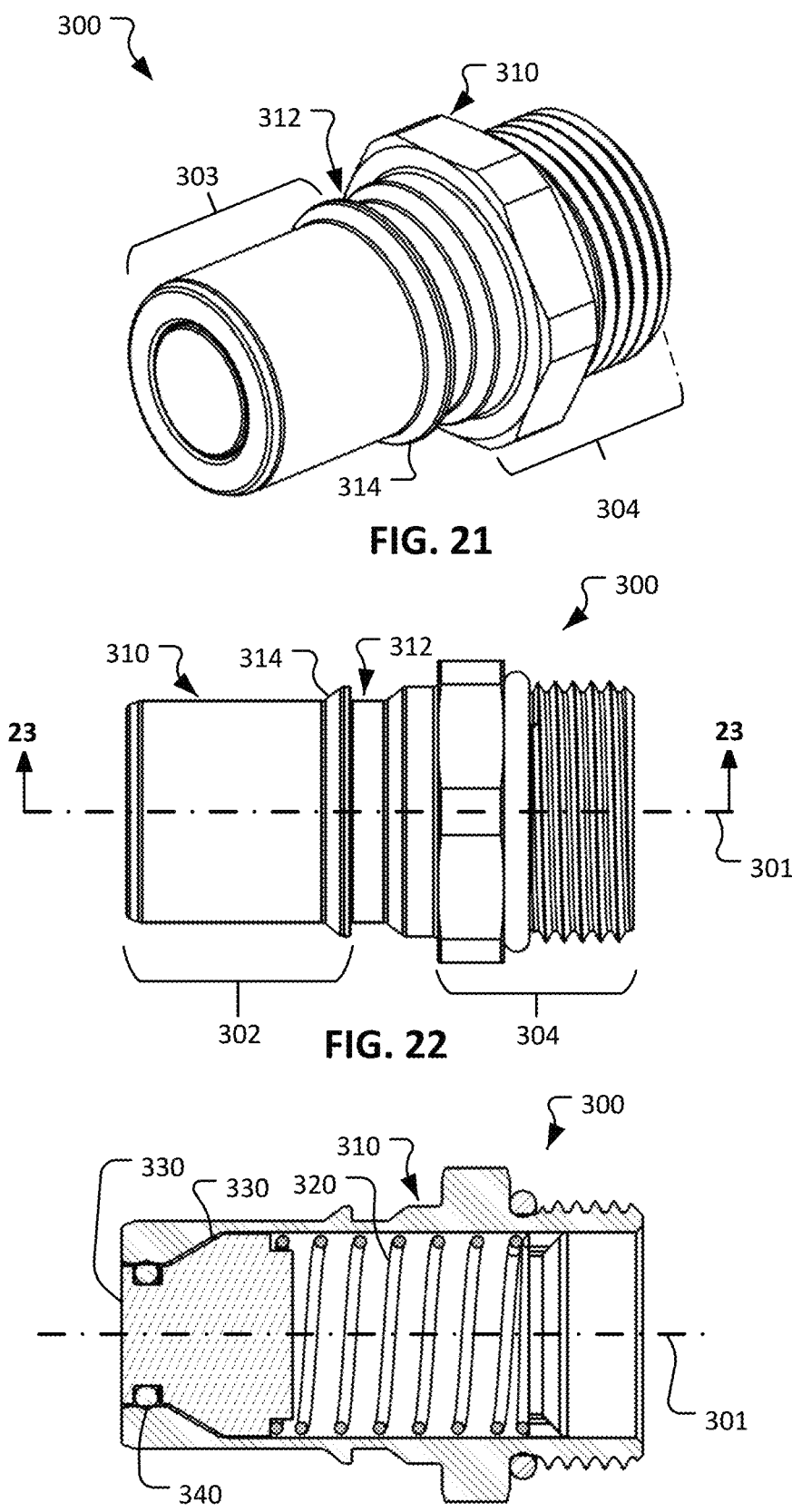
FIG. 21 is a perspective view of another example fluid coupling in accordance with some embodiments.
FIG. 22 is a side view of the fluid coupling of FIG. 21.
FIG. 23 is longitudinal cross-section view of the fluid coupling of FIG. 21.

FIGS. 21 and 22 provide views of another example fluid coupling 300. The fluid coupling 300 can be connected with another fluid coupling (e.g., a female coupling, not shown) to establish a fluid flow path extending through the fluid coupling 300 and the connected fluid coupling. Thereafter, the fluid couplings can be disconnected to close the fluid flow path (with one or both of the fluid coupling 300 and the female coupling closing the fluid flow path when uncoupled). Hence, it can be said that the male coupling 300 and a compatible female coupling are designed and configured to be releasably coupleable with each other.

In some embodiments, the female coupling (not shown) can include an actuatable latch that is engageable within a latch groove 312 of the male fluid coupling 300 to releasably detain the male fluid coupling 300 and the female coupling in a coupled, operable configuration. In some embodiments, no such latch is included and no latch groove 312 is included on the male fluid coupling 300. In such a case, the male fluid coupling 300 and the female coupling can be mechanically forced toward each other and then held in that arrangement to put/keep them in the coupled, operable configuration.

In the depicted embodiment, the fluid coupling 300 includes a main body 310. The main body 310 includes a frustoconical portion 314 that serves as a lead-in to, and partially defines, the latch groove 312. That is, the frustoconical portion 314 includes a lead-in surface arranged at an angle or incline that allows a latch of a female coupling to ride up as the fluid coupling 300 is being coupled with a female coupling. After the latch has been moved past the frustoconical portion 314, the latch can then spring into engagement within the latch groove 312 to attain the fully coupled and latched arrangement.

The main body 310 includes a first end portion 302 and a second end portion 304. The first end portion 302 is configured to engage with another fluid coupling (e.g., a female fluid coupling, not shown). The opposite, second end portion 304 can also be referred to as a termination. In some embodiments, the second end portion 304 can be configured to be engaged with (and fluidly coupled with) a fluid conduit or component such as, but not limited to, a tube, a pipe, a hose, a fitting, a manifold, a container, and the like, without limitation.

In the depicted embodiment, the second end portion 304 is a threaded fitting. In some embodiments, the second end portion 304 can be any other suitable type of fitting or connection such as, but not limited to, a compression fitting, a quick disconnect, a sanitary fitting, hydraulic quick connection, luer fitting, a solder connection, a welded connection, a barbed connection, a threaded connection (e.g., straight thread or pipe thread), and so on, without limitation. Such connections can be straight (as depicted) or in another arrangement such as, but not limited to, a 90° elbow arrangement, a 45° elbow, a straight fitting, a Tee fitting, a Y-fitting, and so on.

Referring also to the cross-sectional view of FIG. 23, the fluid coupling 300 includes a spring 320, a valve member 330, and a seal 340. The valve member 330 is movable relative to the main body 310 along a longitudinal axis 301 of the fluid coupling 300 between a closed position (as shown) and an open position in which an open fluid flow path is defined through the fluid coupling 300.

Fluid is blocked by the valve member 330 from flowing through the fluid coupling 300 when the valve member 330 is in its closed position (as shown). Fluid can flow through the fluid coupling 300 when the valve member 330 is in its open position.

The spring 320 tends to force or bias the valve member 330 to its closed position. The valve member 330 can be moved towards its open position as a result of the fluid coupling 300 becoming engaged with another coupling (e.g., a female coupling).

The seal 340 is engaged with the valve member 330 and fluidly seals against an inner bore of the main body 310 while the valve member 330 is in its closed position (as shown).

Figure 24:
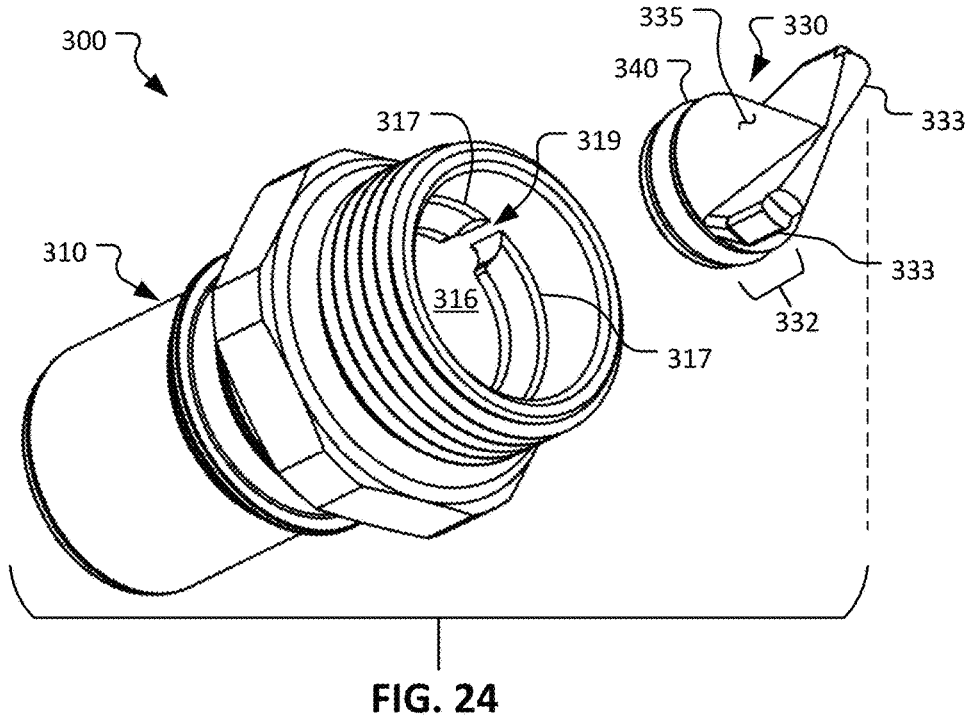
FIG. 24 is an exploded perspective view of the fluid coupling of FIG. 21.
Figure 25:
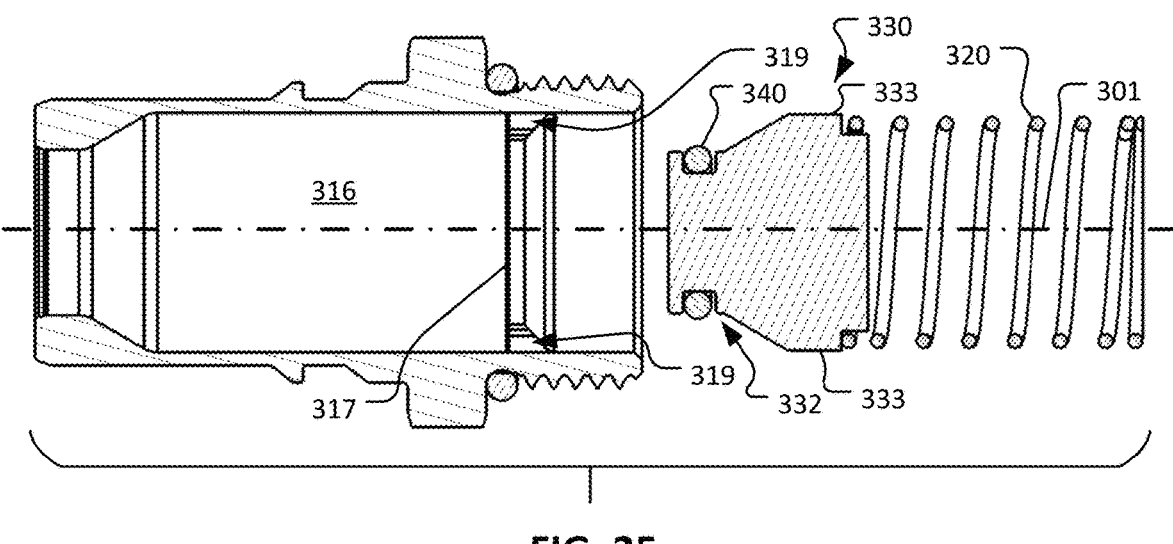
FIG. 25 is an exploded cross-sectional view of the fluid coupling of FIG. 21.

Referring also to the exploded views of FIGS. 24 and 25, more structural features of the main body 310 and the valve member 330 are visible here (the spring 320 is not shown in FIG. 24). For example, it can be seen that the internal region of the second end portion 304 of the main body 310 includes two arcuate radial protrusions 317. Two gaps 319 are defined (only one of the two gaps 319 is visible in this view) between the two arcuate radial protrusions 317. In some embodiments, the gaps 319 are wider than depicted.

It can also be seen that the valve member 330 includes a cylindrical seal groove portion 332 which receives the seal 340. Extending from the seal groove portion 332 are a conical portion 335 and two fins 333 that radially flare outward in comparison to the seal groove portion 332. The two fins 333 gradually flare radially outward from the seal groove portion 332 to an opposite end portion where the two fins 333 have their maximum width from the axis 301. That maximum width of the two fins 333 is slightly smaller than the inner diameter of the internal space 316 (e.g., see FIG. 23). The ends of the two fins 333 define notches that receive a coil or two of the spring 320. In some embodiments, three, four, or more than four of the fins 333 and gaps 319 are included on the valve member 330 and main body 310 respectively.

The assembly process of the fluid coupling 300 will now be explained. First, the valve member 330 is inserted into the internal space 316 of the main body 310 via the second end portion 304 of the main body 310. In particular, the two fins 333 of the valve member 330 need to be aligned with the two gaps 319 of the main body 310, and then the valve member 330 can be inserted into the internal space 316. Because of physical interference between the two fins 333 and the two arcuate radial protrusions 317, the valve member 330 is not insertable into the internal space 316 unless the two fins 333 are aligned with, and pass through, the two gaps 319.

Next and lastly, the spring 320 can be installed into the internal space 316 of the main body 310. This can be performed by inserting a free end of the spring 320 into one of the two gaps 319 of the main body 310, and then screwing, rotating, or twisting the spring 320 relative to the main body 310 (e.g., about the axis 301) to advance it into the internal space 316. In some embodiments, this can be performed by simply pressing the spring 320 into the internal space 316 (causing the coils of the spring 320 to radially compress as they pass the arcuate radial protrusions 317 (which include ramped surfaces). In some embodiments, a funnel-like fixture can be used to assist with gradual radial compressing of the spring 320 as it is inserted into the internal space 316. The final configuration is as shown in FIG. 23. Here again, the fluid coupling 300 can be assembled using essentially a relatively simple two-step process.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Although a number of implementations have been described in detail above, other modifications are possible. In addition, other steps may be provided, or steps may be eliminated, and other components may be added to, or removed from, the described systems. Accordingly, other implementations are within the scope of the following claims.

What is claimed is:

1. A fluid coupling comprising:
   a main body defining an internal space and a longitudinal axis, the main body comprising a first end configured to couple with another fluid coupling and a termination end opposite of the first end, the first end defining an opening leading to the internal space;
   a spring disposed in the internal space; and
   a valve member that is longitudinally movable within the internal space between: (i) an open position in which a fluid flow path through the fluid coupling is defined and (ii) a closed position in which the fluid flow path is blocked by the valve member, the valve member comprising:
      a front face;
      a seal groove portion defining a seal groove;
      a post on an opposite end of the valve member in comparison to the seal groove portion; and
      multiple deflectable elements coupled to the post as cantilevers and extending toward the seal groove portion, wherein the deflectable elements are radially deflectable between: (i) a compressed configuration in which an outer diameter of the deflectable elements is less than or equal to an inner diameter of the opening and (ii) a relaxed configuration in which a maximum outer diameter of the deflectable elements is greater than the inner diameter of the opening.

2. The fluid coupling of claim 1, wherein free ends of the multiple deflectable elements abut against an internal wall of the main body that defines the opening when the valve member is in the closed position.

3. The fluid coupling of claim 1, wherein a portion of the fluid flow path extends longitudinally through the post when the valve member is in the open position.

4. The fluid coupling of claim 1, wherein a portion of the spring is coiled around the post.

* * * * *